Figure 1:
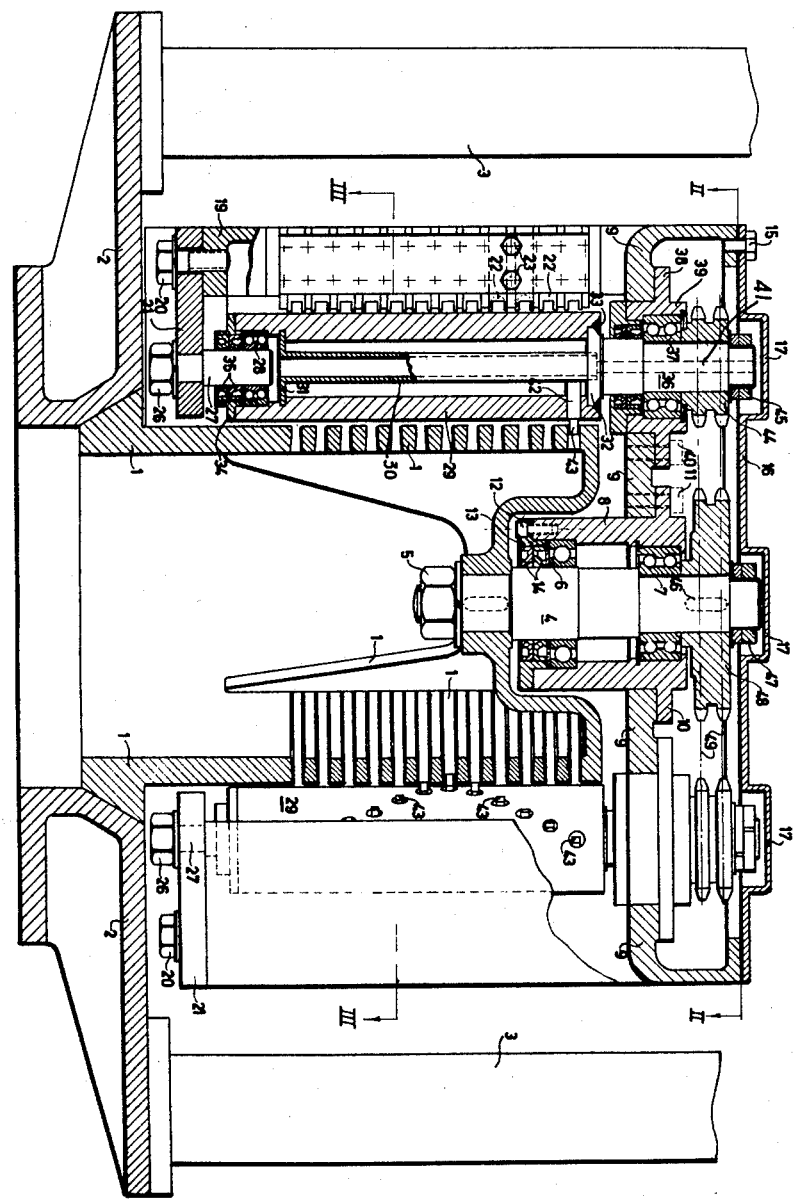

April 19, 1960  A. JELLESMA  2,933,189
SYSTEM FOR HANDLING SEWAGE WATER AND THE LIKE
Filed Feb. 19, 1958  2 Sheets-Sheet 2
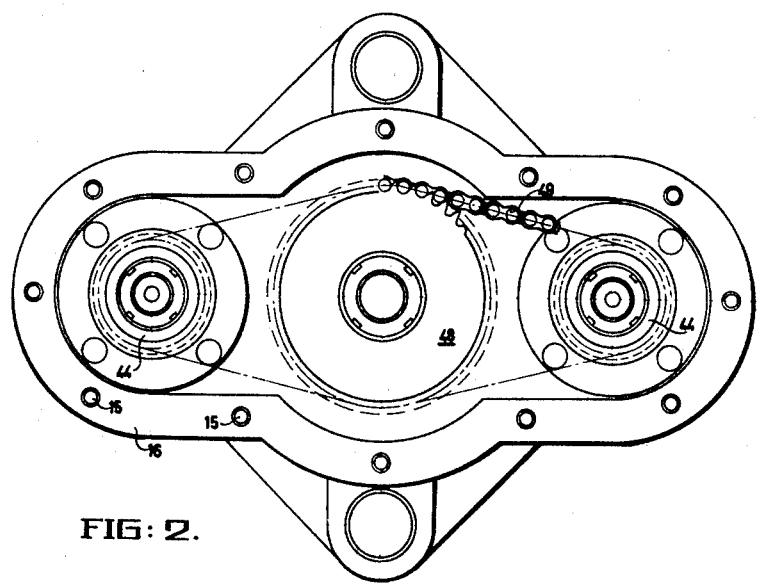
FIG: 2.
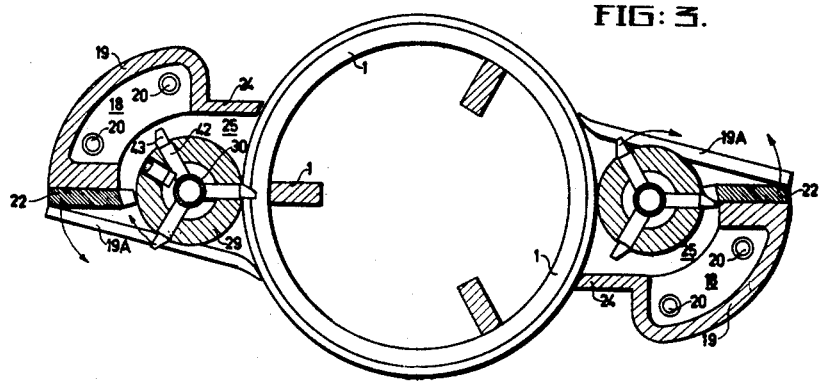
FIG: 3.

United States Patent Office 2,933,189
Patented Apr. 19, 1960

2,933,189
SYSTEM FOR HANDLING SEWAGE WATER AND THE LIKE

Anne Jellesma, Sneek, Netherlands, assignor to W. Hubert & Co., Machinenfabriek N.V., Sneek, Netherlands, a Dutch limited-liability company Application February 19, 1958, Serial No. 716,224

Claims priority, application Netherlands February 21, 1957

7 Claims. (Cl. 210—174)

This invention relates to new and useful improvements in systems for handling sewage water and the like. Its principal object is to provide a system of screen and comminuters whereby the incoming liquid is stirred by means of one or more comminuters which in operation are put in a rotating motion about their axis proper and simultaneously about a stationary drum-like screen or strainer, and to comminute or reduce to a small size the solids on continually varying spots divided over the entire room of the screen chamber so that the solid particles distributed over said incoming sewage water are unable to settle untimely in the catch pit gully in which said screen system is disposed and no accumulation will occur of all crushed materials on one invariable spot.

With these and other objects and advantages in view, this invention resides in a system for handling sewage water and the like in which is comprised the combination of a stationary drum-like screen or strainer, and one or more comminuters associated with said screen or strainer and serving to reduce the solids which are intercepted thereby. The comminuters are disposed, at least in part under the level of the incoming liquid and each of said comminuters bears rotatably on a supporting member associated with said comminuter. A support arranged rotatable about the axis of said stationary drum-like screen or strainer carries all of the supporting members associated with said comminuters present in the system.

The invention further lies in the several novel features hereinafter fully set forth and claimed.

The accompanying drawings show one embodiment of the invention, by way of example, and the invention will now be described disclosing still more special features. In the drawings:

Figure 1 is a view partly in side elevation and partly in vertical longitudinal section of a structure illustrating a simple embodiment of the system forming the subject matter of the present invention, Figure 2 is a horizontal section taken on the line II—II of Fig. 1, and Figure 3 is a horizontal section taken on the line III—III of Fig. 1.

Referring to said drawings the reference character 1 designates the stationary drum-like screen or strainer being fixed on a base 2 the whole of said structure being adapted to be disposed in a sink hole of a gully system by means of two columns 3. Co-operating with the axis of said screen or strainer 1 a shaft pin 4 is fixedly secured thereto by means of a nut 5. A sleeve 8 is arranged rotatably about said shaft pin 4, and is supported by ball bearings 6 and 7. By means of bolts and nuts 11 a support 9 is secured to a blade 10 being part of said sleeve 8, and arranged continuously thereabout. In respect of the sleeve 8 the ball bearing 6 is caged with the aid of an adjusting ring 13 secured to the bottom side of said sleeve 8 by means of bolts and nuts 12, forced lubrication rings 14 being arranged between said adjusting ring 13 and the shaft pin 4. The top end of said support 9 is closed with the aid of a plate 16 secured to said support by means of bolts and nuts 15 said plate 16 showing three protruding portions 17. By connecting the middle of said portions 17 to the driving shaft of e.g. an electromotor (not shown in the drawings) said middle portion being arranged concentrically about the axis of the whole device, the support 9 can be set in a rotating motion about the stationary shaft pin 4. Consequently the support 9 rotates with respect to the stationary drum-like screen or strainer 1.

Two combs 18 are fixedly secured to the support 9 (see also Figure 3). Each of said combs 18 consists of a curve-shaped bearer 19 the top side of which is fixedly secured to the body of said support 9 while on the bottom side of said bearer 19 a support 21 is secured by means of bolts and nuts 20. The meaning of said support 21 will be explained hereinafter. The bearer 19 is provided with horizontally arranged slots in which counter-cutters 22 are placed in such manner as to be adjustable in longitudinal direction, said counter-cutters 22 being fixed in their adjusted positions by means of intermediate steel tap bolts 23. It has to be observed that the bearer 19 is provided with a blade 24 of which the free edge is turned towards the drum-like screen or strainer 1 leaving generally a slight clearance between both of them. As a result thereof a closed chamber 25 comes into being, and the crushed materials will go to said chamber 25 being further carried away towards the screen or strainer 1 by the comminuters. Consequently the crushed materials will pass through the slots of the drum-like screen or strainer 1 along with the flowing sewage water to the main gully.

By means of a nut 26 a spindle 27 is fixedly secured on the support 21 already mentioned hereinbefore. The comminuter is arranged rotatably about said spindle 27 by means of a ball bearing 28. The comminuter consists of a thick-walled hollow cylinder 29, a hollow shaft 30 extending inside said hollow cylinder 29, said shaft 30 being connected to said cylinder 29 by means of a flange 31 and a detachable cover member 32. For this purpose said cover member 32 is welded to the cylinder 29 on the seam 33. The ball bearing 28 is maintained in position by means of an adjusting ring 34 arranged on the cylinder 29, two lubrication rings 35 being positioned inside of said adjusting ring 34.

The cover member 32 extends upwardly as a spindle 36 which, by means of a ball bearing 37, is rotatably supported in a sleeve 39 provided with a continuous blade 38 arranged thereon. By means of bolts and nuts 40, said sleeve 39 is secured on the support 9 which for this purpose is provided with an appropriate bore, the sleeve 39 fitting exactly in said bore. Thus the comminuter is freely rotatable on the one hand in the support 9 and on the other hand in the support 21 rigidly secured to said support 9 by means of the comb bearer 19.

The hollow shaft 30 bears a plurality of teeth 42 protruding through the wall of said cylinder 29 the sharp-ended ends of said teeth 42 being able to pass through the counter-knives 22 of the combs 18. At the same time said hollow shaft 30 serves as a means of supplying oil to the lower ball bearing 28 from the chamber in which the driving gear is arranged, for which purpose the hollow shaft 30 communicates with a central bore arranged in the spindle 36. The teeth 42, arranged in several planes the one above the other, are regularly staggered at a certain angle in respect of the axis of the comminuter. Thus each of said teeth pass successively between two corresponding rings of the screen or strainer 1 as well as between the corresponding counter-knives 22 of the combs 18 so that the power needed to rotate the comminuters can be applied in a smooth way. Finally the bearer 19 is provided with a scraping member 19A arranged at the bottom edge of said bearer.

A toothed wheel 44 for driving the spindle 36 is arranged onto the top end thereof, said toothed wheel 44 being pressed against the innermost cushion of the ball bearing 37 by means of a clamping device 45. Thus when said toothed wheel 44 is set in motion said spindle 36 and the whole comminuter associated therewith will be put in a rotating motion. By means of a wedging member 46 and a clamping device 47, respectively, a toothed wheel 48 is fixedly secured on the shaft pin 4. Two endless link chains 49 run about said toothed wheel 48 and both toothed wheels 44 arranged at both sides of said wheel 48. Each of said chains 49 co-operates with one complete set of toothed rims flush with each other and each of said toothed wheels 44, 48 comprise two toothed rims the one above the other. Thus when the support 9 has been put in a rotating motion about said stationary toothed wheel 48 said toothed wheels 44 also will be put in a rotating motion so that all moving parts of the whole system are operated by means of a single driving motor. As a matter of course it is possible to vary the method of indirectly driving said comminuters to give them a rotating motion such as, for example, by driving directly said toothed wheels arranged on the comminuters from a rim provided on the inside with teeth and arranged on the support 9.

While the invention has been shown and described in connection with a simple embodiment, it is to be understood that the apparatus can be varied in several details while the number of comminuters is not essential within the scope of this invention.

What is claimed is:

1. In a system for handling sewage water, the combination of a stationary drum-like screen defining an axis, at least one comminuter operatively associated with said screen and serving to reduce the solids which are intercepted thereby, said comminuter being disposed at least in part under the level of incoming liquid, a supporting member rotatably supporting the comminuter, and a support rotatable about the axis of said stationary drum-like screen and carrying said supporting member.

2. In a system for handling sewage water, the combination of a stationary drum-like screen, at least one comminuter operatively associated with said screen and serving to reduce the solids which are intercepted thereby, said comminuter being disposed at least in part under the level of incoming liquid, said stationary drum-like screen including a shaft pin fixedly secured thereto, a supporting member rotatably supporting said comminuter, and a support rotatable about said shaft pin of said drum-like screen and carrying said supporting member.

3. In a system for handling sewage water, the combination of a stationary drum-like screen defining an axis and including rings, at least one comminuter operatively associated with said screen and serving to reduce the solids which are intercepted thereby, said comminuter being disposed at least in part under the level of incoming liquid and comprising a shaft including several peripheral teeth and a comb including a plurality of counter-cutters, said shaft and said comb being parallel to the axis of the drum-like screen, a common supporting member supporting said shaft and comb, said shaft being rotatable on said common supporting member, said comb being fixedly secured to the supporting member to enable said teeth to pass between the rings of the drum-like screen as well as between the counter-cutters of said comb, and a support rotatable about the axis of said stationary drum-like screen and carrying said common supporting member.

4. In a system for handling sewage water, the combination of a stationary drum-like screen defining an axis and including rings, at least one comminuter operatively associated with said screen and serving to reduce the solids which are intercepted thereby, said comminuter being disposed at least in part under the level of incoming liquid and comprising a shaft including peripheral teeth and a comb including counter-cutters, said shaft and said comb being parallel to the axis of the drum-like screen, a common supporting member supporting said shaft and comb, said shaft being rotatable on said common supporting member, the said comb being fixedly secured to the supporting member, said teeth being positioned in several planes one above the other and being regularly staggered at a predetermined angle with respect to the axis of said shaft, enabling each of said teeth passing respectively between two of said counter-cutters of said comb, and a support rotatable about the axis of said stationary drum-like screen carrying said common supporting member.

5. In a system for handling sewage water, the combination of a stationary drum-like screen defining an axis, at least one comminuter operatively associated with said screen and serving to reduce the solids which are intercepted thereby, said comminuter being disposed at least in part under the level of incoming liquid and comprising a shaft including peripheral teeth and a comb including counter-cutters, said shaft and said comb being parallel to the axis of said drum-like screen, a common supporting member supporting said shaft and comb, said shaft being rotatable on said common supporting member, said comb being fixedly secured to said supporting member and provided with horizontally arranged slots, said counter-cutters being placed in the said slots in a longitudinally adjustable manner, and a support rotatable about the axis of said drum-like screen and carrying said supporting member.

6. In a system for handling sewage water, the combination of a stationary drum-like screen defining an axis, at least one comminuter operatively associated with said screen and serving to reduce the solids which are intercepted thereby, said comminuter being disposed at least in part under the level of incoming liquid, a supporting member rotatably supporting the comminuter, said comminuter comprising a shaft including peripheral teeth and comb including counter-cutters, a curved bearer supporting the comb and comprising a blade including a free end turned towards said drum-like screen and defining a slight clearance therewith, said shaft and said comb being parallel to the axis of said drum-like screen, a common supporting member supporting the shaft and comb, said shaft being rotatable on said common supporting member and said comb being fixedly secured thereto, and a support rotatable about the axis of said stationary drum-like screen and carrying said common supporting member.

7. In a system for handling sewage water, the combination of a stationary drum-like screen, at least one comminuter operatively associated with said screen and serving to reduce the solids which are intercepted thereby, said comminuter being disposed at least in part under the level of incoming liquid, a supporting member rotatably supporting said comminuter, a support rotatable about the axis of said stationary drum-like screen and carrying said supporting member, a single driving source atop said system, all movable parts in said system being driven by said driving source, said driving source driving said support and gear means coupled to said driving source, said comminuter being driven indirectly by said gear means.

References Cited in the file of this patent

UNITED STATES PATENTS 2,614,695    Nordell _____ Oct. 21, 1952

FOREIGN PATENTS 865,580    Germany _____ Feb. 2, 1953